United States Patent [19]

Borba

[11] 4,198,928
[45] Apr. 22, 1980

[54] COMBS FOR REMOVING BOT EGGS AND THE LIKE FROM HAIR

[76] Inventor: Paul A. Borba, 626 Smith Neck Rd., South Dartmouth, Mass. 02748

[21] Appl. No.: 893,060

[22] Filed: Apr. 3, 1978

[51] Int. Cl.² .............................................. A01K 13/00
[52] U.S. Cl. ........................................ 119/92; 119/156
[58] Field of Search ........................ 119/83, 87, 86, 90, 119/92, 156, 157; 30/90.1, 90.4, 351, 355, 357, 346.56, 169; 132/158

[56] References Cited

U.S. PATENT DOCUMENTS

| | | | |
|---|---|---|---|
| 785,589 | 3/1905 | Brown | 119/92 |
| 1,706,251 | 3/1929 | Perry | 30/348 X |
| 2,187,939 | 1/1940 | Holden | 132/158 X |
| 2,361,402 | 10/1944 | Jamieson | 30/90.4 X |
| 2,799,930 | 7/1957 | Champlin | 30/355 |
| 3,710,406 | 1/1973 | Stanford | 30/90.1 X |

*Primary Examiner*—Louis G. Mancene
*Assistant Examiner*—Robert P. Swiatek

[57] ABSTRACT

A comb for use in removing bot eggs from the coats of horses is a thin, reinforced blade with the teeth formed by photo-etching. The spaces between the teeth have a minimum width in the neighborhood of 0.006 to 0.008 inches and a maximum width at their outer ends in the approximate range of from 0.015 to 0.020 inches with the thinness of the steel providing the teeth with effective egg-scraping margins.

3 Claims, 3 Drawing Figures

BOTT EGG

HAIR SHAFT

COMBS FOR REMOVING BOT EGGS AND THE LIKE FROM HAIR

BACKGROUND OF THE INVENTION

It has long been recognized that bot flies represent a health hazard to horses as, if the eggs are ingested, the larvae of such flies become attached to a horses stomach and later are discharged with manure. Typically, the adult fly emerges therefrom in mid summer and during its short seven to ten day life apan, up to five hundred eggs are laid on the horse's hair, generally in the lower leg area. As a horse attempts to remove the eggs by biting or licking, the eggs are ingested.

Proper care of a horse requires that its coat be regularly examined during the critical mid summer period for deposits of bot eggs and any observed deposits be promptly removed. The eggs are about the size of a strawberry seed and are yellow-orange. While such eggs may be scraped from the shafts of hairs using one's finger nails, other procedures are obviously preferable.

One such procedure is to shave the infected area, a procedure that is objectionable, particularly in the case of show horses because shaved areas would be noticeable. Another method is to treat the infected area with a chemical that attacks the glue-like mulare deposited on the hair along with the eggs. This procedure is effective but somewhat messy. Yet another procedure is a spun glass block that is effective but difficult to use.

THE PRESENT INVENTION

The general objective of the invention is to provide combs that effect the scraping of the hair being combed, an objective attained with a reinforced stainless steel blade with teeth formed along an edge thereof by photo-etching, the tooth formation being such as to provide that the outer open end of the space between each two teeth is dimensioned to accommodate several hairs but the minimum space between each two teeth is but slightly greater than the maximum diameter of a hair, the blade thinness providing effective, marginal scraping edges for each such space.

Another general objective of the invention is to provide such a comb, particularly adapted for use in removing bot eggs from the coats of horses, an objective attained with the space between each two teeth having a throat that is of the minimum width thereof and with an inner end dimensioned to accommodate a plurality of hairs.

Yet another objective of the invention is to provide that the blade reinforcement is in the form of a back of U-shaped section receiving the blade and crimped thereto with one end of the back pivotally connected to one end of a handle having a blade receiving slot therein and to enable the handle to function as a guard for the tooth edge.

BRIEF DESCRIPTION OF THE DRAWINGS

A preferred embodiment of the invention is illustrated by the accompanying drawings

THE PREFERRED EMBODIMENT OF THE INVENTION

The comb illustrated by the drawings is particularly adapted for use in removing bot eggs from horses. The comb includes a blade 5 of stainless steel sufficiently thin to enable the teeth 6 to be formed by photo-etching. The thickness of the steel stock is within the range of from 0.003 to 0.008 inches.

Figure 1:
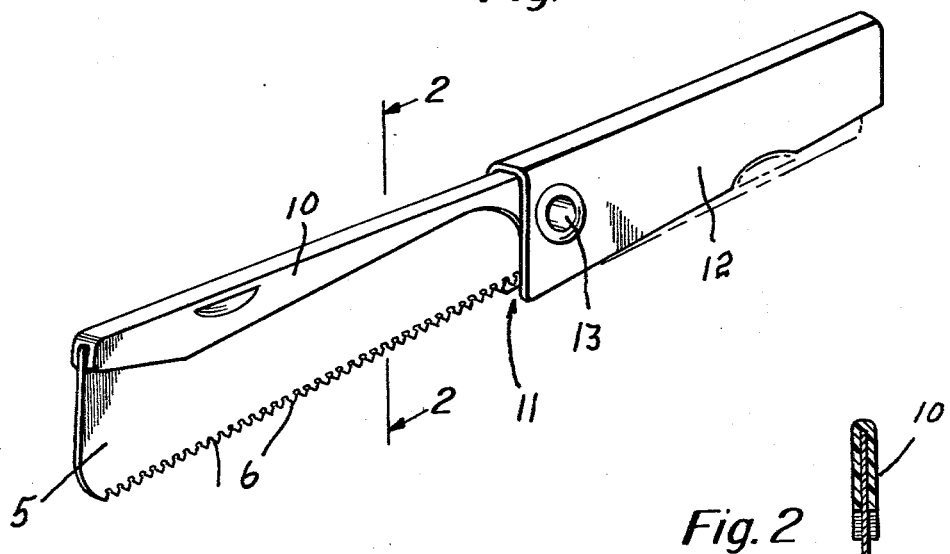
FIG. 1 is a perspective view of a comb in accordance with the invention opened for use.
Figure 2:
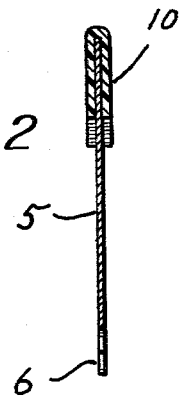
FIG. 2 is a section, on an increase in scale, taken approximately along the indicated line 2—2 of FIG. 1.
Figure 3:
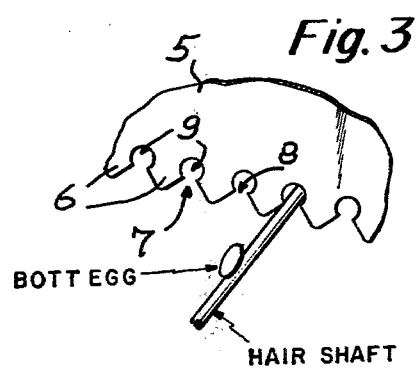
FIG. 3 is a fragmentary view showing the tooth formation on a further increase in scale and somewhat schematically illustrating the use of the comb.

In the illustrated embodiment, the teeth 6 are so shaped, see FIG. 3, that the space between each two teeth has an open end or entrance 7, the width of which is in the approximate range of from 0.015 to 0.020 inches and tapering to a throat 8 in the approximate range of 0.006 to 0.008 inches as the maximum diameter of horse hair is about 0.005 inches. The inner end 9 of each space is substantially circular with a diameter that does not exceed 0.012 inches thus to accommodate a plurality of hairs. The length of each tooth 6 is substantially equal to its maximum width and the points of the teeth are approximately right angular.

Because of the flexibility of the blade stock due to its thinness, the blades require reinforcement. As the teeth 6 are short and the blade 5 relatively narrow, adequate reinforcement is effected by the back 10 which is U-shaped in cross section to receive the back edge of the blade to which it is crimped.

The rear end of the back 10 and the blade 5 extend into the forward end of a channel 11 extending lengthwise of a handle 12 and the blade and back are pivotally connected thereto as by means of an eyelet 13 enabling them to be swung to enter the toothed edge of the blade 5 into the channel 11 when the comb is not to be used.

When in use, the comb is pulled lengthwise of the infected area and the hair or hairs within the inner ends 9 of the spaces between the teeth are effectively scraped with the blade held substantially at right angles to the area being combed.

I claim:

1. A comb for use in removing bot fly eggs from horse hair shafts, said comb including a blade of steel stock the thickness of which is in the approximate range of 0.003 to 0.008 of an inch, said blade provided with a series of teeth along one edge thereof, the stock thickness such that said teeth can be formed by photo-etching, and stiffening means secured to said blade to prevent unwanted flexing, said teeth being of an arrowhead shape with the junction between each two teeth defining a major arc and dimensioned freely to receive at least one horse hair shaft, the thickness of the blade stock establishing the margins of the teeth and of their junctions as edges that are sufficiently sharp to ensure the scraping of bot eggs from the shafts during use of the comb, the length of each tooth being so related to its width as to be substantially inflexible during use.

2. The comb of claim 1 in which the minimum width of the space between each two teeth is in the approximate range of 0.006 to 0.008 inch and the diameter of said arcuate junctions is in the order of 0.012 inch.

3. The comb of claim 1 in which the length of each tooth is substantially equal to its maximum width.

* * * * *